United States Patent
Seki

(10) Patent No.: US 8,218,681 B2
(45) Date of Patent: Jul. 10, 2012

(54) OFDM TRANSMITTER AND OFDM RECEIVER

(75) Inventor: Yuta Seki, Yokohama (JP)

(73) Assignee: Panasonic Corporation, Osaka (JP)

( * ) Notice: Subject to any disclaimer, the term of this patent is extended or adjusted under 35 U.S.C. 154(b) by 666 days.

(21) Appl. No.: 12/440,894

(22) PCT Filed: Sep. 11, 2006

(86) PCT No.: PCT/JP2006/317989
§ 371 (c)(1),
(2), (4) Date: Mar. 11, 2009

(87) PCT Pub. No.: WO2008/032357
PCT Pub. Date: Mar. 20, 2008

(65) Prior Publication Data
US 2010/0074369 A1    Mar. 25, 2010

(51) Int. Cl.
*H04L 27/00* (2006.01)
(52) U.S. Cl. ........ 375/299; 375/135; 375/136; 375/137; 375/141; 375/142; 375/150; 375/219; 375/259; 375/260; 375/261; 375/267; 375/295; 375/316; 375/324; 375/343; 375/347; 375/349; 375/364; 375/365; 375/366
(58) Field of Classification Search .......... 375/135–137, 375/141–142, 150, 219, 267, 295, 299, 316, 375/324, 343, 347, 349, 258–261, 364, 365, 375/366
See application file for complete search history.

(56) References Cited

U.S. PATENT DOCUMENTS

| 6,741,578 | B1 | 5/2004 | Moon |
| 7,505,522 | B1 * | 3/2009 | Larsson ................... 375/260 |
| 7,577,160 | B2 * | 8/2009 | Larsson et al. ............ 370/430 |
| 7,593,475 | B2 * | 9/2009 | Trachewsky ............. 375/267 |

FOREIGN PATENT DOCUMENTS

| JP | 2000-196498 A | 7/2000 |
| JP | 2002-543737 A | 12/2002 |

(Continued)

OTHER PUBLICATIONS

Ericsson "Proposal for update of Common Pilot Channel description in 25.211" Oct. 1999 pp. 1-3.*

(Continued)

*Primary Examiner* — Sam K Ahn
*Assistant Examiner* — Sophia Vlahos
(74) *Attorney, Agent, or Firm* — Dickinson Wright PLLC

(57) ABSTRACT

An OFDM transmitter and receiver realizing high-speed cell search and having a reducible circuit scale. An OFDM transmitter includes an SCH inserting section for constructing a frame where a synchronization sequence in a predetermined position from the head of a first sub-frame is arranged and a synchronization sequence composed of the symbols of the former synchronization sequence and the symbols whose I, Q components are interchanged is arranged in a predetermined position from the head of a second sub-frame adjacent in the time-axis direction to the former sub-frame, an IFFT section, a P-SCH conversion section, and an RF transmitting section for transmitting this frame. Thus, the receiving end of the frame can locate the position of either synchronization sequence and determine the frame timing from that position, thereby increasing the speed of the cell search.

5 Claims, 9 Drawing Sheets

FOREIGN PATENT DOCUMENTS

JP    2006-060765 A    3/2006

OTHER PUBLICATIONS

"3rd Generation Partnership Project; Technical Specification Group Radio Access Network; Requirements for Evolved UTRA (E-UTRA) and Evolved UTRAN (E-UTRAN) (Release 7)," Technical Report 3GPP TR 25.913 (V7.0.0), 3GPP Organizational Partners, Sophia Antipolis, France, Jun. 2005, 15 pages.

"Comparison on Cell Search Time Performance Between SCH-Replica Based and Auto-Correlation Based Detections in E-UTRA Downlink," Report R1-061187, 3GPP TSG RAN Meeting #45, Shanghai, China, May 8-12, 2006, 10 pages.

"Physical Channels and Multiplexing in Evolved UTRA Downlink," 3GPP TSG RAN WG1 Ad Hoc on LTE, Report R1-050590, Sophia Antipolis, France, Jun. 20-21, 2005, 24 pages.

* cited by examiner

OFDM TRANSMITTER AND OFDM RECEIVER

TECHNICAL FIELD

The present invention relates to an OFDM transmitting apparatus and an OFDM receiving apparatus. More particularly, the present invention relates to an OFDM transmitting apparatus transmitting synchronizing sequences and an OFDM receiving apparatus receiving the synchronizing sequences and performing synchronization control.

BACKGROUND ART

In the standards organization 3GPP (3rd Generation Partnership Project), studies are conducted for 3GPP LTE (Long Term Evolution) to realize further improvement of present third mobile phone systems. An OFDM scheme is likely to be adopted as a downlink radio communication scheme disclosed in Non-patent Document 1 that fulfills the requirements of the LTE system.

In cellular systems such as the mobile phone systems, cell search technique of searching for the optimal base station to connect the radio link by mobile stations upon starting communication, upon performing a handover, upon waiting communication for carrying out intermittent reception, and so on, is one of significant functions. In the standardization meetings, various cell search methods in LTE systems are studied (see Non-Patent Document 2).

FIG. 1 shows the configuration of synchronization channel (SCH) proposed in Non-Patent Document 2. As shown in the figure, in a ten millisecond radio frame, SCHs are multiplexed on the tail symbols in the tenth and twelfth subframes in the frequency domain. The bandwidth where the SCHs are allocated is placed in the central 1.25 MHz in the bandwidth assigned to the base station. Further, SCHs are classified into two kinds, that is, primary SCHs (P-SCHs) and secondary SCHs (S-SCHs).

In the first step of cell search processing in this cell search method, the receiver performs correlation detection between a received signal and a P-SCH replica signal the receiver holds, to detect the symbol timing. Here, averaging the correlation outputs of P-SCHs at two positions in one radio frame allows symbol timing detection characteristics to improve. In the second step, the receiver performs a DFT on a received signal at the symbol timing acquired in the first step and performs correlation detection with respect to the S-SCHs in the frequency domain, to detect the frame timing and the cell ID group. In the third step, the receiver acquires the correlation with respect to the reference signal multiplied by the scrambling code unique to the cell belonging to the detected cell ID group and detects a cell ID from the detected group.

Non-patent Document 1: 3GPP, TR 25.913v7.0.0 (2005-06), "Requirements for Evolved UTRA and UTRAN"

Non-patent Document 2: 3GPP, R1-061187, NTT DoCoMo, Fujitsu, Mitsubishi Electric, NEC, Panasonic, Toshiba Corporation "Comparison on Cell Search Time Performance between SCH-Replica Based and Auto-Correlation Based Detections in E-UTRA Downlink"

DISCLOSURE OF INVENTION

Problems to be Solved by the Invention

However, in the above-described conventional cell search method, in cases where the same sequence is used for a plurality of P-SCHs allocated in a frame, a frame timing cannot be detected in the first step processing, and it is necessary to detect the frame timing using S-SCHs in the second step. Further, in cases where different sequences are used for a plurality of P-SCHs allocated in a frame, at the receiving side of the frame, the amount of correlation calculation increases between a received signal and a P-SCH replica signal and the number of correlators increases, and therefore circuit scale increases.

The present invention is made in view of the above-described problems, and it is therefore an object of the present invention to provide an OFDM transmitting apparatus and OFDM receiving apparatus that realizes high speed cell search and reduces the circuit scales.

Means for Solving the Problem

The OFDM transmitting apparatus of the present invention adopts a configuration including: a frame forming section that forms a frame, in which a synchronizing sequence is allocated in a predetermined symbol position from a beginning of a first subframe in a plurality of subframes, and in which another synchronizing sequence is allocated in a predetermined symbol position from a beginning of a second subframe neighboring the first subframe in a time domain, said another sequence being formed with a symbol, in which an in-phase component and a quadrature component are reversed from a symbol of the synchronizing sequence; and a transmitting section that transmits the frame.

The OFDM receiving apparatus of the present invention adopts a configuration including: a receiving section that receives a frame, in which a synchronizing sequence is allocated in a predetermined symbol position from a beginning of a first subframe in a plurality of subframes, and in which another synchronizing sequence is allocated in a predetermined symbol position from a beginning of a second subframe neighboring the first subframe in a time domain, said another sequence being formed with a symbol, in which an in-phase component and a quadrature component are reversed from a symbol of the synchronizing sequence; and a timing detection section that detects correlation using a received signal sequence received in the receiving section and a synchronizing sequence replica, wherein the timing detection section includes: four multipliers that multiply all combinations of an in-phase component and quadrature component of the received signal sequence and an in-phase component and quadrature component of the synchronizing sequence replica; a first adder that adds a result of multiplying the in-phase component of the received signal sequence and the in-phase component of the synchronizing sequence replica to a result of multiplying the quadrature component of the received signal sequence and the quadrature component of the synchronizing sequence replica; a second adder that subtracts the result of multiplying the in-phase component of the received signal sequence and the quadrature component of the synchronizing sequence replica from the result of multiplying the quadrature component of the received signal sequence and the in-phase component of the synchronizing sequence replica; a third adder that adds the result of multiplying the in-phase component of the received signal sequence and the quadrature component of the synchronizing sequence replica to the result of multiplying the quadrature component of the received signal sequence and the in-phase component of the synchronizing sequence replica; and a fourth adder that subtracts the result of multiplying the quadrature component of the received signal sequence and the quadrature component of the synchronizing sequence replica from the result of multiplying the in-phase component of the received signal sequence and the in-phase component of the synchronizing sequence replica.

Advantageous Effect of the Invention

According to the present invention, it is possible to provide an OFDM transmitting apparatus and OFDM receiving apparatus for realizing high speed cell search and reducing the circuit scales.

BEST MODE FOR CARRYING OUT THE INVENTION

Figure 1:
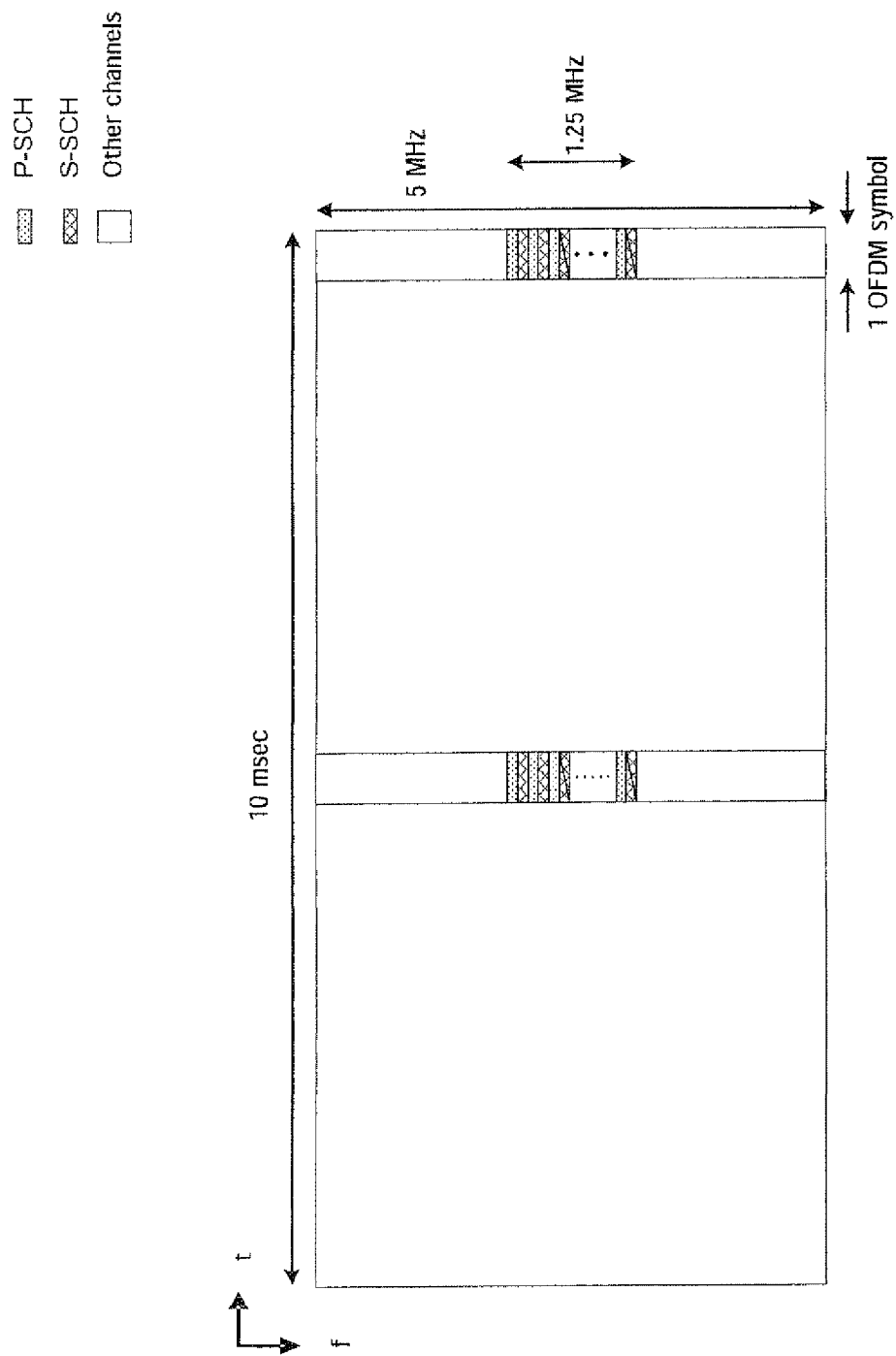
FIG. 1 explains a configuration of synchronization channels proposed conventionally.

Now, embodiments of the present invention will be described in detail with reference to the accompanying drawings. In the embodiments, the same reference numerals will be assigned to the same components, and therefore the overlapping descriptions will be omitted.

Embodiment 1

Figure 2:
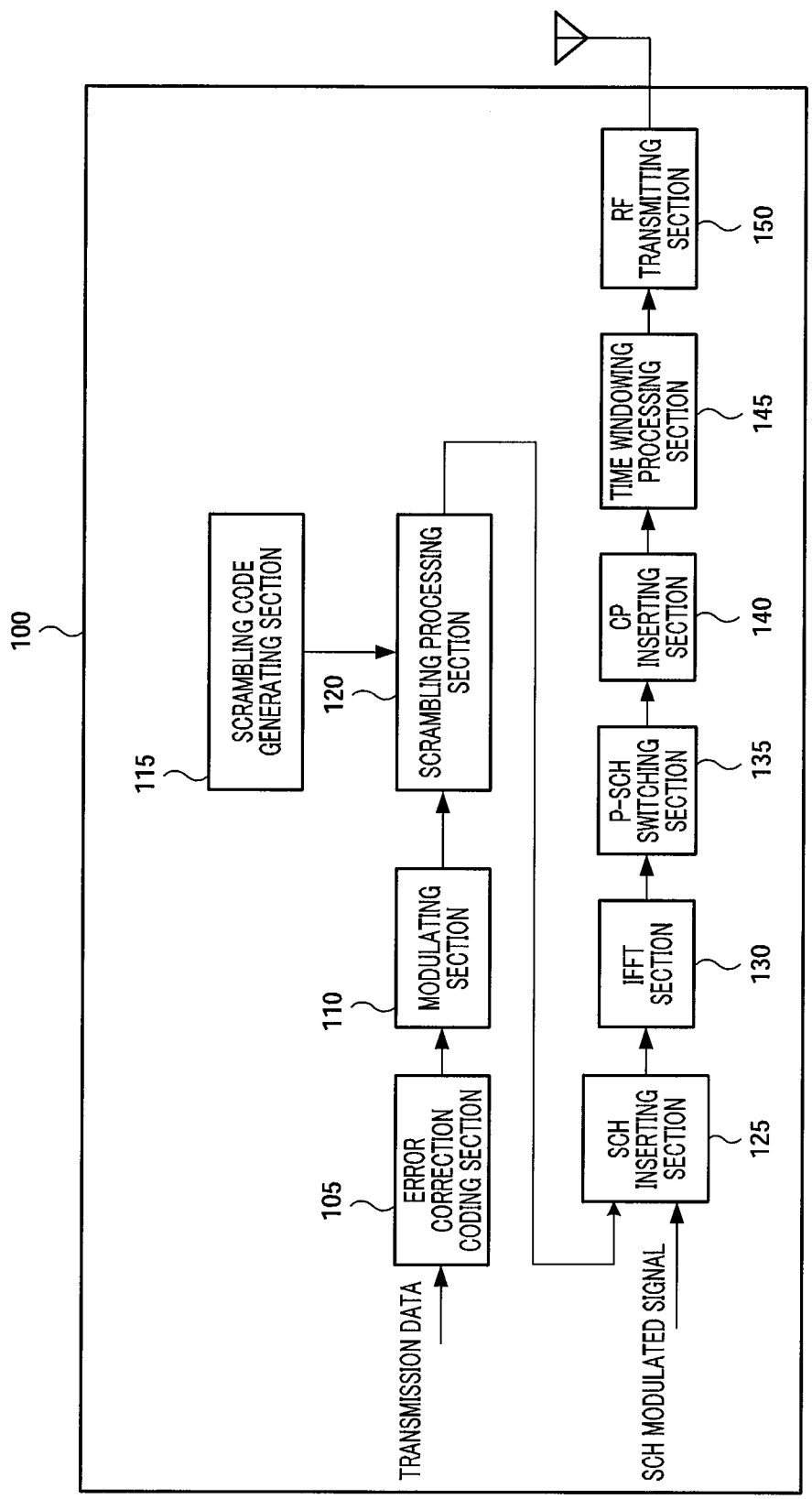
FIG. 2 is a block diagram showing the configuration of the base station apparatus, according to Embodiment 1 of the present invention.

Referring to FIG. 2, base station apparatus 100 as the OFDM transmitting apparatus of Embodiment 1, has error correction coding section 105, modulating section 110, scrambling code generating section 115, scrambling processing section 120, SCH inserting section 125, IFFT section 130, P-SCH switching section 135, CP inserting section 140, time windowing ("TW") processing section 145 and RF transmitting section 150.

Error correction coding section 105 performs predetermined coding on transmission data, which is an input signal, and outputs the coded transmission data to modulating section 110.

Modulating section 110 performs predetermined primary modulation on the signal after coding processing, which is the input signal, and outputs the modulated signal to scrambling processing section 120.

Scrambling code generating section 115 generates a scrambling code according to the unique cell ID of the base station apparatus, and outputs the scrambling code to scrambling processing section 120.

Scrambling processing section 120 performs scrambling by multiplying the modulated signal, which is the input signal, and the scrambling code, and outputs the signal after scrambling to SCH inserting section 125.

SCH inserting section 125 maps a SCH sequence in a frame in the frequency domain (i.e. to subcarriers in an OFDM signal). Here, two sub-frames are prepared in one frame, and a synchronizing sequence is allocated in the frequency domain in predetermined symbol positions from the beginning of each sub-frame. In other OFDM symbols, the signal after scrambling in scrambling processing section 120 is allocated. That is, the SCH sequence and the signal after scrambling in scrambling processing section 120 are time-multiplexed.

IFFT section 130 performs an inverse fast Fourier transform of the input signal and converts the frequency domain signal into a time domain signal, to generate an OFDM signal, and outputs the OFDM signal to P-SCH switching section 135.

Figure 3:
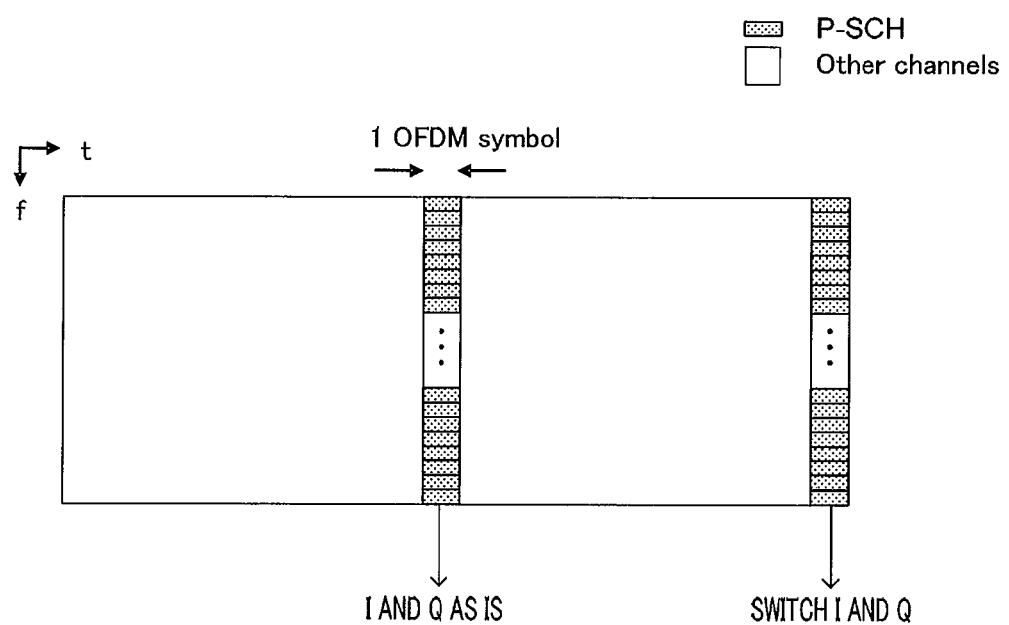
FIG. 3 illustrates for explanation of the frame configuration transmitted from the base station apparatus of FIG. 2.

P-SCH switching section 135 performs P-SCH switching processing of switching the I and Q components of P-SCH sequence symbols alone in an OFDM signal to input. Further, here, the frame having the configuration shown in FIG. 3, that is, a configuration in which two sub-frames are prepared in one frame and in which the I and Q components of the P-SCH sequences allocated in the sub-frames are switched between the sub-frames, is transmitted from base station apparatus 100. For that reason, P-SCH switching section 135 does not particularly perform processing on the synchronizing sequence allocated in predetermined symbol positions from the beginning of the first sub-frame in the two sub-frames, and switches only the I and Q components of the synchronizing sequence allocated in predetermined symbol positions from the beginning of the second sub-frame. By this means, by specifying a position of one of the synchronizing sequences, the frame receiving side is able to specify the beginning of the frame from the position, that is, the frame timing. As long as the transmitting side and the receiving side already know, any P-SCH sequences may be switched.

CP inserting section 140 allocates a copy of the tail part of the inputted OFDM symbol to the beginning of that OFDM symbol, that is, inserts a cyclic prefix ("CP").

TW processing section 145 filters the OFDM signal for maintaining the continuity of the waveform of the OFDM signal after inserting a CP, and outputs the OFDM signal after the filtering processing to RF transmitting section 150.

RF transmitting section 150 performs radio processing (e.g. D/A conversion and up-conversion) on the input signal and transmits the input signal subject to radio processing via the antenna.

Figure 4:
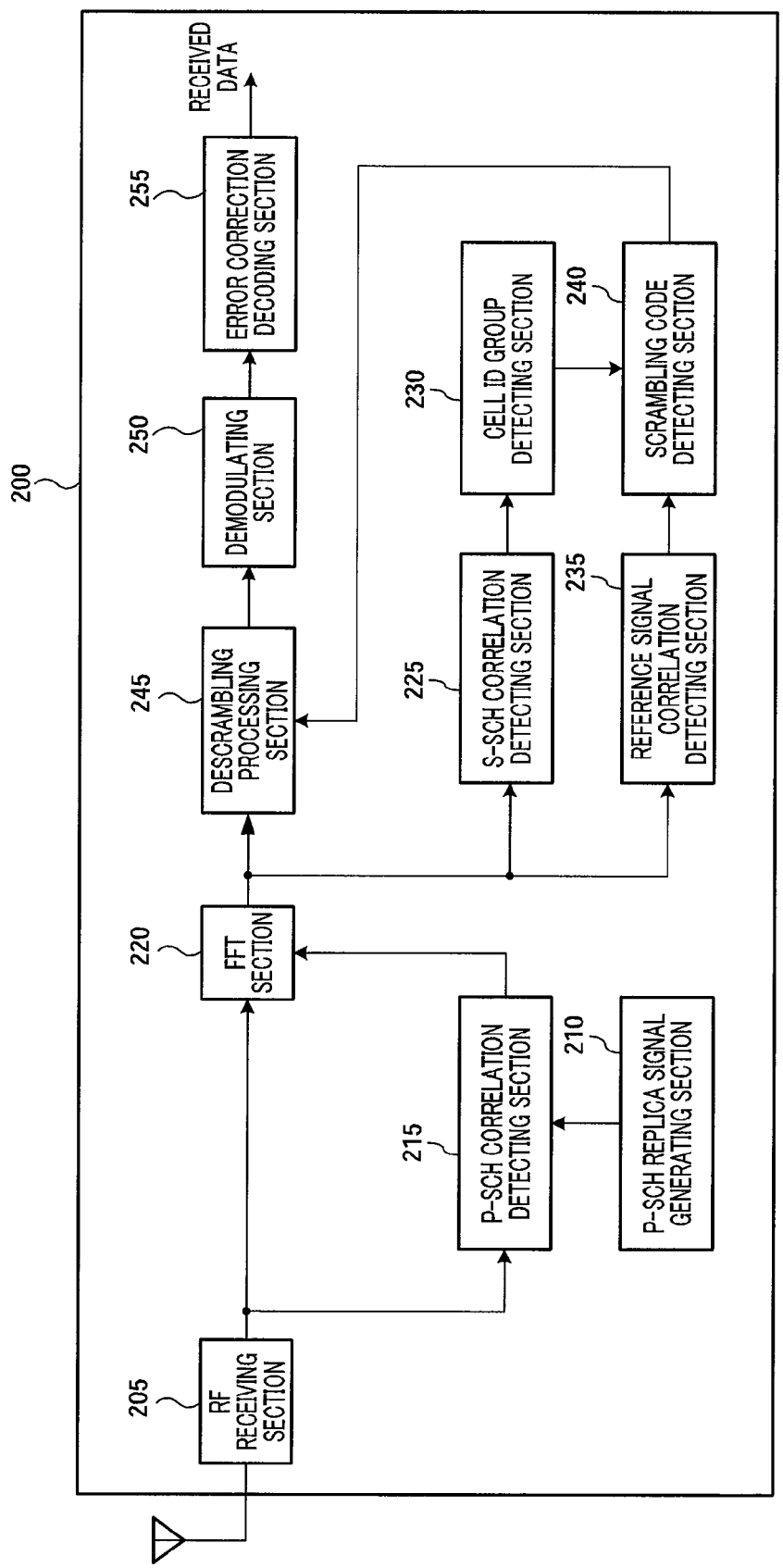
FIG. 4 is a block diagram showing the configuration of the mobile station apparatus, according to Embodiment 1 of the present invention.

Referring to FIG. 4, mobile station apparatus 200 as the OFDM receiving apparatus of Embodiment 1, has RF receiving section 205, P-SCH replica signal generating section 210, P-SCH correlation detecting section 215, FFT section 220, S-SCH correlation detecting section 225, cell ID group detecting section 230, reference signal correlation detecting section 235, scrambling code detecting section 240, descrambling processing section 245, demodulating section 250 and error correction decoding section 255.

RF receiving section 205 performs radio receiving processing (e.g. A/D conversion and down-conversion) on a received signal received via the antenna, and outputs the received signal after radio receiving processing to P-SCH correlation detecting section 215 and FFT section 220.

P-SCH replica signal generating section 210 generates a P-SCH similar to the P-SCH transmitted in base station apparatus 100, and outputs the generated P-SCH to P-SCH correlation detecting section 215.

P-SCH correlation detecting section 215 finds the correlation between the P-SCH replica signal (i.e. the signal of the I and Q components as is and switching the I and Q components) and the received signal, detects the timing a peak occurs, and outputs timing information to FFT section 220. Here, in the frame transmitted from base station apparatus 100 of the transmitting side, a synchronizing sequence is allocated in predetermined symbol positions from the beginning of the first sub-frame, and a synchronizing sequence formed with symbols in which the I and Q components are reversed from the synchronizing sequence symbols of the first subframe is allocated in predetermined symbol positions from the beginning of the second sub-frame neighboring the first sub-frame in the time domain. That is, different P-SCH sequences are allocated on a per sub-frame basis, so that, by detecting a peak of a P-SCH sequence, it is possible to specify in which sub-frame the P-SCH sequence is allocated, thereby specifying the frame timing in the first step of cell search. For that reason, it is possible to realize high speed cell search. Further, although the P-SCH sequence allocated in each sub-frame is unique, the P-SCH sequence is not independent each other and the I and Q components are switched, so that it is possible to share multipliers used in correlation calculation and reduce the circuit scales at the receiving side. The specified frame timing is reported to S-SCH correlation detecting section 225 and reference signal correlation detecting section 235.

Figure 5:
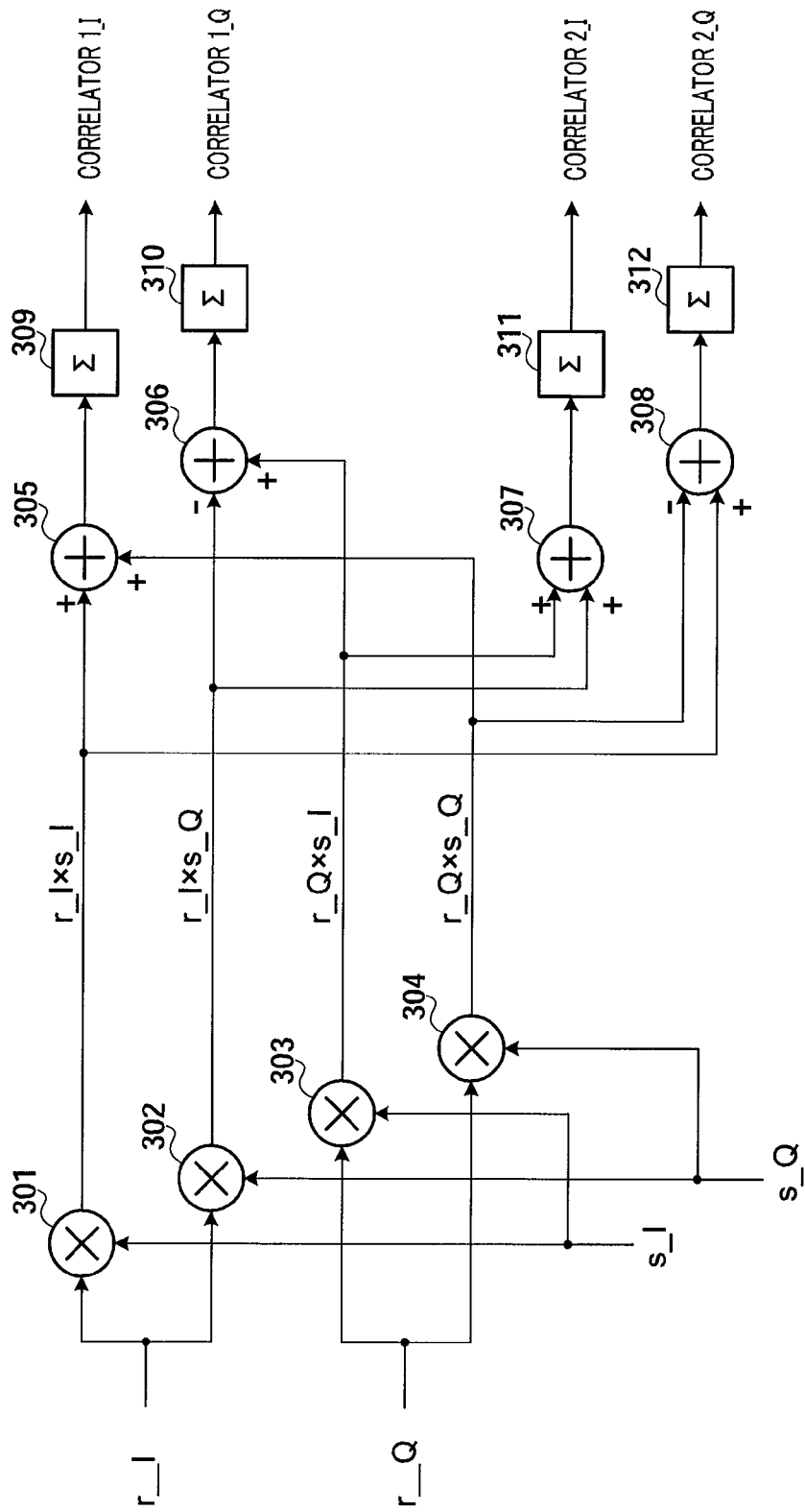
FIG. 5 shows a configuration example of the P-SCH correlation detecting section of FIG. 4.

Referring to FIG. 5, P-SCH correlation detecting section 215 specifically has first multiplier 301, second multiplier 302, third multiplier 303, fourth multiplier 304, first adder 305, second adder 306, third adder 307, fourth adder 308, first accumulator 309, second accumulator 310, third accumulator 311 and fourth accumulator 312.

First multiplier 301 multiplies the I component of the received signal (r_I), which is the input signal in P-SCH correlation detecting section 215 and which is subjected to radio receiving processing in RF receiving section 205, and the I component of a P-SCH replica signal (s_I), and outputs the result to first adder 305 and fourth adder 308.

Second multiplier 302 multiplies the I component of the input signal (r_I) in P-SCH correlation detecting section 215 and the Q component of the P-SCH replica signal (s_Q), and outputs the result to second adder 306 and third adder 307.

Third multiplier 303 multiplies the Q component of the received signal (r_Q) subjected to radio receiving processing in RF receiving section 205 and the I component of the P-SCH replica signal (s_I), and outputs the result to second adder 306 and third adder 307.

Fourth multiplier 304 multiplies the Q component of the received signal (r_Q) subjected to radio receiving processing in RF receiving section 205 and the Q component of the P-SCH replica signal (s_Q), and outputs the result to first adder 305 and fourth adder 308.

First adder 305, second adder 306, third adder 307 and fourth adder 308 are each configured to add input signals such that the input is changeable as positive or negative. In Embodiment 1, as described above, in the frame transmitted from base station apparatus 100 of the receiving side, a synchronizing sequence is allocated in predetermined symbol positions from the beginning of the first sub-frame, and a synchronizing sequence formed with symbols in which the I and Q components are reversed from the synchronizing sequence symbols of the first subframe is allocated in the predetermined symbol positions from the beginning of the second sub-frame neighboring the first sub-frame in the time domain. For that reason, with regards to inputs of either positive or negative in first adder 305, both the input from first multiplier 301 and the input from fourth multiplier 304 are positive. With regards to inputs of either positive or negative in second adder 306, the input from second multiplier 302 is negative and the input from third multiplier 303 is positive. With regards to inputs of either positive or negative in third adder 307, both the input from second multiplier 302 and the input from third multiplier 303 are positive. With regards to inputs of either positive or negative in fourth adder 308, the input from fourth multiplier 304 is negative and the input from first multiplier 301 is positive.

First accumulator 309, second accumulator 310, third accumulator 311 and fourth accumulator 312 accumulate output signals from first adder 305, second adder 306, third adder 307 and fourth adder 308, respectively.

In this way, the first correlator is configured with first multiplier 301, second multiplier 302, third multiplier 303, fourth multiplier 304, first adder 305, second adder 306, first accumulator 309 and second accumulator 310, and the second correlator is configured with first multiplier 301, second multiplier 302, third multiplier 303, fourth multiplier 304, third adder 307, fourth adder 308, third accumulator 311 and fourth accumulator 312. That is, the first correlator and the second correlator are shared with first multiplier 301, second multiplier 302, third multiplier 303 and fourth multiplier 304.

Then, the output of first accumulator 309 is the I component of the first correlator, and the output of second accumulator 310 is the Q component of the first correlator. Further, the output of third accumulator 311 is the I component of the second correlator, and the output of fourth accumulator 312 is the Q component of the second correlator.

The operations of P-SCH correlation detecting section 215 are represented as the following equations.

The first correlator $\Sigma(r\_I+js\_Q) \times (s\_I-js\_Q)$

The second correlator $\Sigma(r\_I+js\_Q) \times (s\_Q-js\_I)$

Here, the received signal is represented as (r_I+js_Q) and the SCH replica sequence is represented as (s_I−js_Q) and (s_Q−js_I) where the I and Q components are switched, and where j represents an imaginary number.

Referring back to FIG. 4, FFT section 240 removes the CP based on the timing information (i.e. symbol timing) inputted from P-SCH correlation detecting section 215. Further, FFT section 220 performs Fourier transform (FFT) processing at the timing position based on the timing information (i.e. symbol timing), and outputs the signal after Fourier transform processing to S-SCH correlation detecting section 225, reference signal correlation detecting section 235 and descrambling processing section 245.

S-SCH correlation detecting section 225 detects the correlation between the signal after the FFT and the SCH sequence, and output the correlation result to cell ID group detecting section 230. S-SCH correlation detecting section 225, having been reported the frame timing from P-SCH correlation detecting section 215, is able to know in what positions in the frame the S-SCH is allocated.

Based on the correlation result detected in S-SCH correlation detecting section 225, cell ID group detecting section 230 detects the cell ID group and outputs information on the detected cell ID group to scrambling code detecting section 240.

Reference signal correlation detecting section 235 detects the correlation between the signal after the FFT and the pilot sequence, and outputs the signal after correlation detection to scrambling code detecting section 240. Reference signal correlation detecting section 235, having been reported the frame timing from P-SCH correlation detecting section 215, is able to know in what positions in the frame a pilot signals is allocated.

Scrambling code detecting section 240 identifies the scrambling code based on the correlation detection result in the pilot correlation detecting section and cell ID group information. This identified scrambling code is outputted to descrambling processing section 245.

Descrambling processing section 245 descrambles the signal after FFT processing using the scrambling code detected in scrambling code detecting section 240, and outputs the signal to demodulating section 250.

Demodulating section 250 demodulates the input signal and outputs the demodulated signal to error correction decoding section 255. Error correction decoding section 255 performs predetermined decoding to acquire received data.

Although, with the above description, P-SCH switching processing whereby, after the P-SCH is inserted to an OFDM signal, the I and Q components are switched in the part where the S-SCH is inserted, is performed, the present invention is not limited to this, and, for example, IFFT and OFDM modulation are performed before the P-SCH is inserted, and then the P-SCH signal in which the I and Q components are reversed in the time domain may be inserted. That is, a frame may be formed in which, in a plurality of sub-frames, the synchronizing sequence is allocated in predetermined symbol positions from the beginning of a first sub-frame, and the synchronizing sequence formed with symbols where I and Q components are reversed from the synchronizing sequence symbols of the first sub-frame are allocated in predetermined symbol positions from the beginning of a second sub-frame neighboring the first sub-frame in the time domain.

In this way, according to the present embodiment, the base station apparatus 100 as an OFDM transmitting apparatus has: SCH inserting section 125, IFFT section 130 and P-SCH switching section 135 as a frame forming means for forming a frame in which, in a plurality of sub-frames, the synchronizing sequence is allocated in the predetermined symbol positions from the beginning of a first sub-frame and in which the synchronizing sequence formed with symbols where the I and Q components are reversed from the synchronizing sequence symbols of the first sub-frame is allocated in the predetermined symbol positions from the beginning of a second sub-frame neighboring the first sub-frame in the time domain; and RF transmitting section 150 for transmitting the frame.

By this means, by specifying a position of one of synchronizing sequences without receiving frame timing information, the frame receiving side is able to specify the beginning of the frame from the position, that is, the frame timing. Further, in the frame receiving side, although a P-SCH sequence allocated in each sub-frame is unique, the P-SCH sequence is not independent each other and the I and Q components are switched, so that it is possible to share multipliers used in correlation calculation and reduce the circuit scales of the receiving side.

Further, according to the present embodiment, mobile station apparatus 200 as an OFDM receiving apparatus has: RF receiving section 205 for receiving a frame in which, in a plurality of sub-frames, the synchronizing sequence is allocated in the predetermined symbol positions from the beginning of a first sub-frame and in which the synchronizing sequence formed with symbols where the I and Q components are reversed from the synchronizing sequence symbol of the first sub-frame is allocated in the predetermined symbol positions from the beginning of a second sub-frame neighboring the first sub-frame in the time domain;

P-SCH correlation detecting section 215 as a timing detection means for detecting correlation using a received signal sequence received in RF receiving section 205 and a synchronizing sequence replica; and P-SCH correlation detecting section 215 as a timing detection means has: four multipliers (multipliers 301 to 304) for multiplying all combination whereby each multiplier multiplies the I and Q components of the received signal sequence and the I and Q components of the synchronizing sequence replica; first adder 305 for adding the result of multiplying the I component of the received signal sequence and the Q component of the synchronizing sequence replica to the result of multiplying the Q component of the received signal sequence and the Q component of the synchronizing sequence replica; second adder 306 for subtracting the result of multiplying the I component of the received signal sequence and the Q component of the synchronizing sequence replica from the result of multiplying the Q component of the received signal sequence and the I component of the synchronizing sequence replica; third adder 307 for adding the result of multiplying the I component of the received signal sequence and the Q component of the synchronizing sequence replica to the result of multiplying the Q component of the received signal sequence and the I component of the synchronizing sequence replica; and fourth adder 308 for subtracting the result of multiplying the Q component of the received signal sequence and the Q component of the synchronizing sequence replica from the result of multiplying the I component of the received signal sequence and the I component of the synchronizing sequence replica.

In this way, it is possible to share multipliers used in correlation calculation and reduce the circuit scales of the receiving side.

Embodiment 2

In Embodiment 1, P-SCH switching processing of switching the I and Q components has been performed. By contrast with this, in Embodiment 2, I component alone, or Q component alone is code-inverted as SCH switching processing.

The configuration of the radio communication system of the present embodiment will be the same as in Embodiment 1 and will be explained using FIGS. 2 and 4.

P-SCH switching section 135 performs P-SCH switching processing of inverting the I component alone or Q component alone of a P-SCH sequence symbol in an OFDM signal to input. Further, here, two sub-frames are prepared in one frame, and, P-SCH switching section 135 does not particularly perform processing on the synchronizing sequence allocated in predetermined symbol positions from the beginning of the first sub-frame in the two sub-frames and inverts the I component alone or Q component alone of the synchronizing sequence allocated in predetermined symbol positions from the beginning of the second sub-frame. By this means, by specifying a position of one of the synchronizing sequences, the frame receiving side is able to specify the beginning of the frame from the position, that is, the frame timing. For that reason, it is possible to realize high speed cell search. As long as the transmitting side and the receiving side already know, either P-SCH sequences may be inverted.

P-SCH correlation detecting section 215 finds the correlation between the P-SCH replica signal (i.e. the signal of the I component as is (or Q component as is) and the code-inverting I component (or code-inverting the Q component)) and the received signal, detects the timing a peak occurs, and outputs timing information to FFT section 220. Here, in the frame transmitted from base station apparatus 100 of the transmitting side, a synchronizing sequence is allocated in predetermined symbol positions from the beginning of the first sub-frame, and a synchronizing sequence formed with symbols in which the I component alone or Q component alone is code-inverted from the synchronizing sequence symbol of the first sub-frame at the predetermined symbol positions from the beginning of the second sub-frame neighboring the first sub-frame in the time domain. That is, different P-SCH sequences are allocated on a per sub-frame basis, so that, by detecting a peak of a P-SCH sequence, it is possible to specify in which sub-frame the P-SCH is allocated, thereby specifying the frame timing in the first step of cell search without receiving frame timing information. Further, although the P-SCH sequence allocated in each sub-frame is unique, the P-SCH sequence is not independent each other and the I component alone or the Q component alone is code-inverted, so that it is possible to share multipliers used in correlation calculation and reduce the circuit scales of the receiving side.

Figure 6:
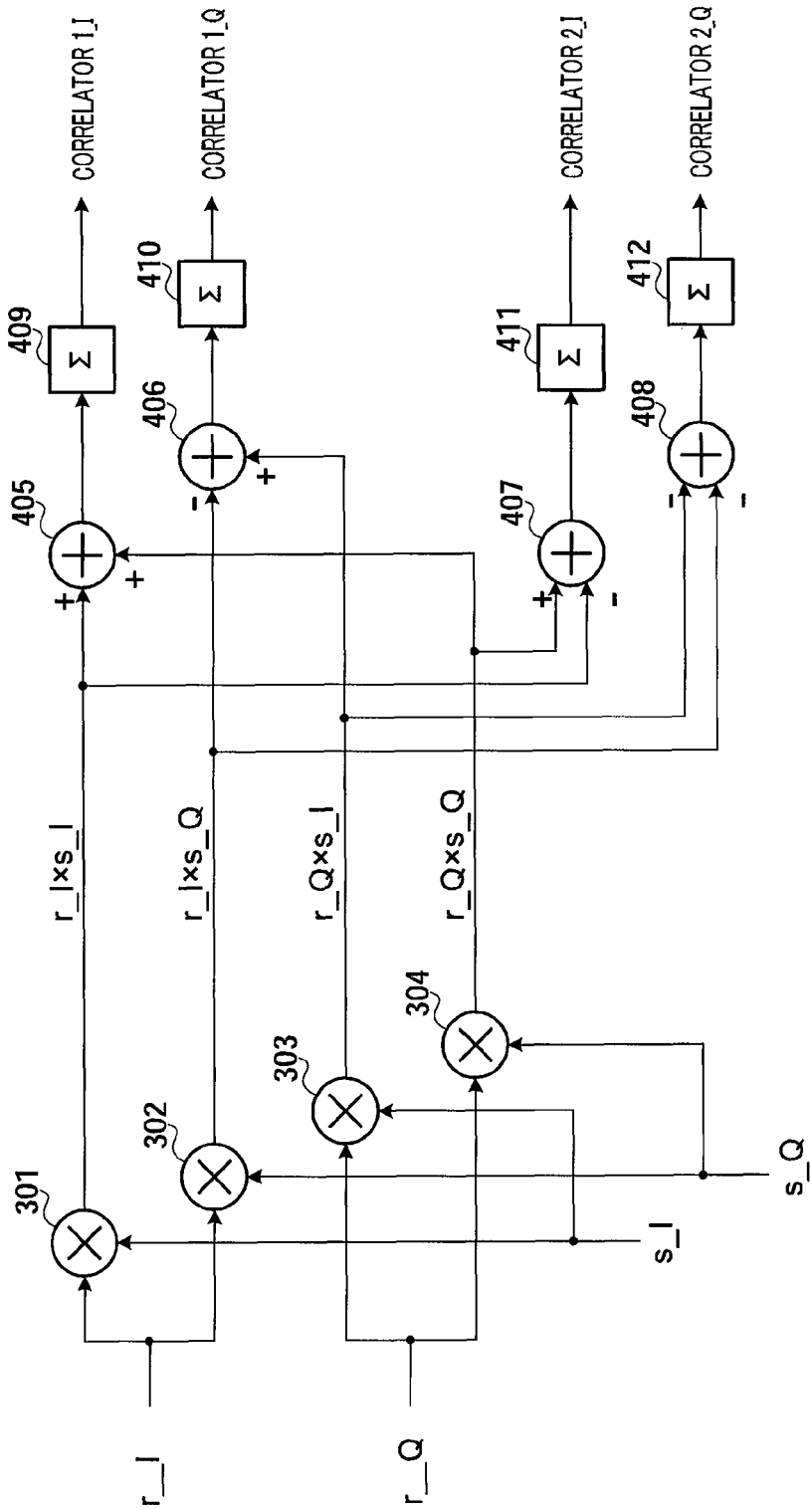
FIG. 6 shows a configuration example of the P-SCH correlation detecting section in Embodiment 2.

FIG. 6 shows the configuration of P-SCH correlation detecting section 215 where the I component alone of the above-described P-SCH sequence is inverted. Referring to the figure, P-SCH correlation detecting section 215 has first adder 405, second adder 406, third adder 407, fourth adder 408, first accumulator 409, second accumulator 410, third accumulator 411 and fourth accumulator 412.

First adder 405, second adder 406, third adder 407 and fourth adder 408 are each configured to add input signals such that the input is changeable as positive or negative. Here, as described above, in the frame transmitted from base station apparatus 100 of the transmitting side, the synchronizing sequence is allocated in the predetermined symbol positions from the beginning of the first sub-frame, and the synchronizing sequence formed with symbols in which the I component alone is code-inverted from the symbol of the synchronizing sequence of the first sub-frame is allocated in the predetermined symbol positions from the beginning of the second sub-frame neighboring the first sub-frame in the time domain. For that reason, with regards to inputs of either positive or negative in first adder 405, both the input from first multiplier 301 and the input from fourth multiplier 304 are positive. With regards to inputs of either positive or negative in second adder 406, the input from second multiplier 302 is negative and the input from third multiplier 303 is positive. With regards to inputs of either positive or negative in third adder 407, the input from first multiplier 301 is negative and the input from fourth multiplier 304 is positive. With regards to inputs of either positive or negative in fourth adder 408, both the input from second multiplier 302 and the input from third multiplier 303 are negative.

First accumulator 409, second accumulator 410, third accumulator 411 and fourth accumulator 412 accumulate output signals from first adder 405, second adder 406, third adder 407 and fourth adder 408, respectively.

In this way, the first correlator is configured with first multiplier 301, second multiplier 302, third multiplier 303, fourth multiplier 304, first adder 405, second adder 406, first accumulator 409 and second accumulator 410, and the second correlator is configured with first multiplier 301, second multiplier 302, third multiplier 303, fourth multiplier 304, third adder 407, fourth adder 408, third accumulator 411 and fourth accumulator 412. That is, the first correlator and the second correlator are shared with first multiplier 301, second multiplier 302, third multiplier 303 and fourth multiplier 304.

Then, the output of first accumulator 409 is the I component of the first correlator, and the output of second accumulator 410 is the Q component of the first correlator. Further, the output of third accumulator 411 is the I component of the second correlator, and the output of fourth accumulator 412 is the Q component of the second correlator.

Figure 7:
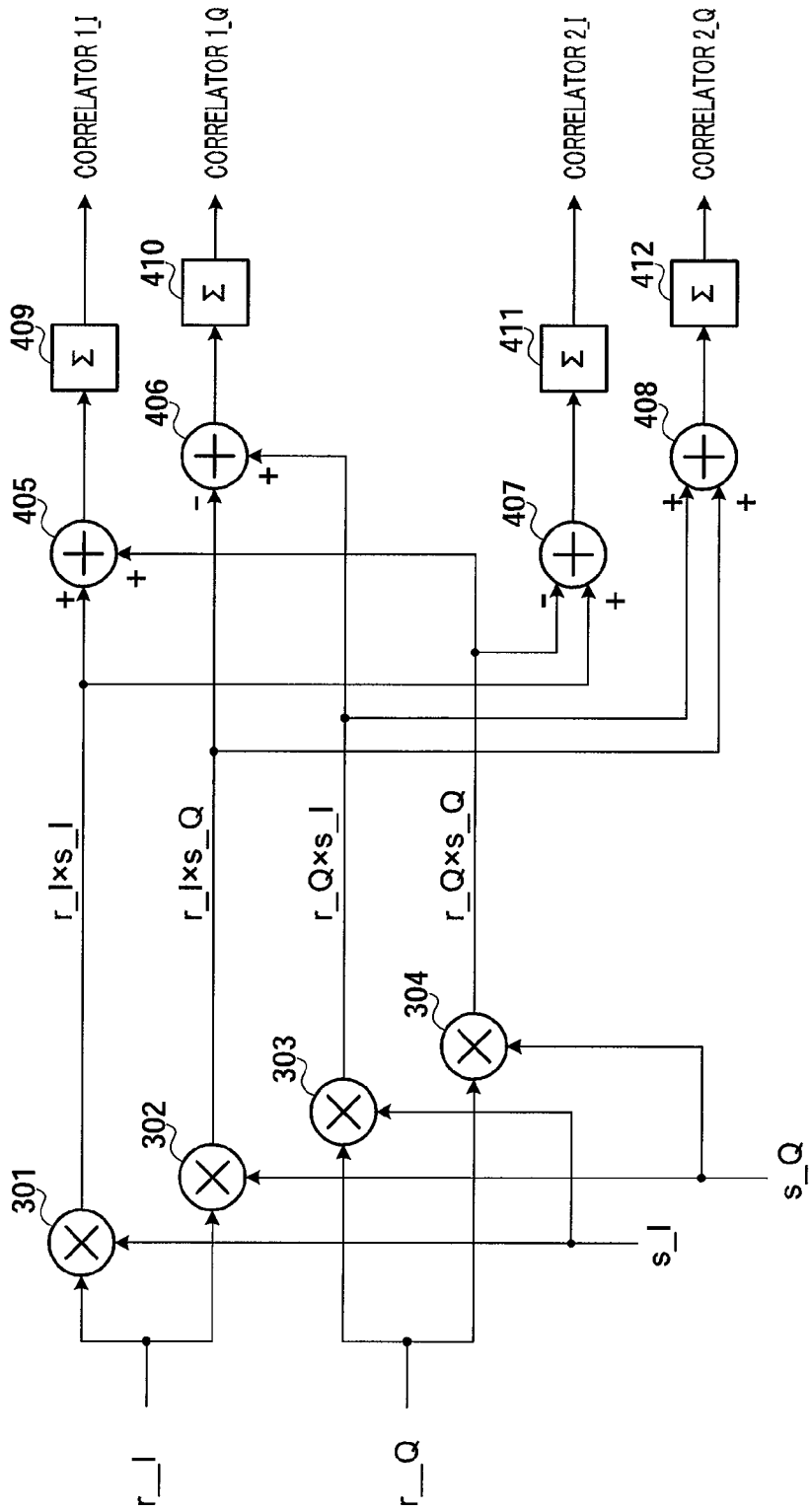
FIG. 7 shows another configuration example of the P-SCH correlation detecting section in Embodiment 2.

FIG. 7 shows the configuration of P-SCH correlation detecting section 215 where the Q component alone of the above-described P-SCH sequence is inverted. FIG. 7 differs from FIG. 6 only in positive inputs or negative inputs to third adder 407 and fourth adder 408. To be more specific, with regards to inputs to third adder 407, the input from first multiplier 301 is positive and the input from fourth multiplier 304 is negative. With regards to inputs to fourth adder 408, both the input from second multiplier 302 and the input from third multiplier 303 are positive.

In this way, according to the present embodiment, the base station apparatus 100 as an OFDM transmitting apparatus has: SCH inserting section 125, IFFT section 130 and P-SCH switching section 135 as a frame forming means for forming a frame in which, in a plurality of sub-frames, the synchronizing sequence is allocated in the predetermined symbol positions from the beginning of a first sub-frame and in which the synchronizing sequence formed with a symbol where the I component alone or the Q component alone are code-inverted from the synchronizing sequence symbol of the first sub-frame is allocated in the predetermined symbol positions from the beginning of a second sub-frame neighboring the first sub-frame in the time domain; and RF transmitting section 150 for transmitting the frame.

By this means, in the frame receiving side, by specifying a position of one of synchronizing sequences without receiving frame timing information, the frame receiving side is able to specify the beginning of the frame from the position, that is, the frame timing and high speed cell search is possible. Further, in the frame receiving side, although a P-SCH sequence allocated in each sub-frame is unique, the P-SCH sequence is not independent each other and the I component alone or the Q component alone is code-inverted, so that it is possible to share multipliers used in correlation calculation and reduce the circuit scales of the receiving side.

Further, according to the present embodiment, mobile station apparatus 200 as an OFDM receiving apparatus has: RF receiving section 205 for receiving a frame in which, in a plurality of sub-frames, the synchronizing sequence is allocated in the predetermined symbol positions from the beginning of a first sub-frame and in which the synchronizing sequence formed with a symbol where the I component alone is code-inverted from the synchronizing sequence symbol of the first sub-frame is allocated in the predetermined symbol positions from the beginning of a second sub-frame neighboring the first sub-frame in the time domain; P-SCH correlation detecting section 215 as a timing detection means for detecting correlation using the synchronizing sequence received in the frame and a synchronizing sequence replica; and P-SCH correlation detecting section 215 as a timing detection means for the detecting correlation has: four multipliers (multipliers 301 to 304) for multiplying all combination whereby each multiplier multiplies the I and Q components of the received signal sequence and the I and Q components of the synchronizing sequence replica; first adder 405 for adding the result of multiplying the I component of the received signal sequence and the I component of the synchronizing sequence replica to the result of multiplying the Q component of the received signal sequence and the Q component of the synchronizing sequence replica; second adder 406 for subtracting the result of multiplying the I component of the received signal sequence and the Q component of the synchronizing sequence replica from the result of multiplying the Q component of the received signal sequence and the I component of the synchronizing sequence replica; third adder 407 for subtracting the result of multiplying the I component of the received signal sequence and the I component of the synchronizing sequence replica from the result of multiplying the Q component of the received signal sequence and the Q component of the synchronizing sequence replica; and fourth adder 408 for adding a signal where the result of multiplying the I component of the received signal sequence and the Q component of the synchronizing sequence replica is inverted negative, to a signal where the result of multiplying the Q component of the received signal sequence and the I component of the synchronizing sequence replica is inverted negative.

In this way, it is possible to share adders used in correlation calculation and reduce the circuit scales of the receiving side.

Further, according to the present embodiment, mobile station apparatus 200 as an OFDM receiving apparatus has: RF receiving section 205 for receiving a frame in which, in a plurality of sub-frames, the synchronizing sequence is allocated in the predetermined symbol positions from the beginning of a first sub-frame and in which the synchronizing sequence formed with a symbol where the Q component alone is code-inverted from the synchronizing sequence symbol of the first sub-frame is allocated in the predetermined symbol positions from the beginning of a second sub-frame neighboring the first sub-frame in the time domain; P-SCH correlation detecting section 215 as a timing detection means for detecting correlation using the synchronizing sequence received in the frame and a synchronizing sequence replica; and P-SCH correlation detecting section 215 as a timing detection means for the detecting correlation has: four multipliers (multipliers 301 to 304) for multiplying all combination whereby each multiplier multiplies the I and Q components of the received signal sequence and the I and Q components of the synchronizing sequence replica; first adder 405 for adding the result of multiplying the I component of the received signal sequence and the I component of the synchronizing sequence replica to the result of multiplying the Q component of the received signal sequence and the component of the synchronizing sequence replica; second adder 406 for subtracting the result of multiplying the I component of the received signal sequence and the Q component of the synchronizing sequence replica from the result of multiplying the Q component of the received signal sequence and the I component of the synchronizing sequence replica; third adder 407 for subtracting the result of multiplying the Q component of the received signal sequence and the Q component of the synchronizing sequence replica from the result of multiplying the I component of the received signal sequence and the I component of the synchronizing sequence replica; and fourth adder 408 for adding the result of multiplying the component of the received signal sequence and the component of the synchronizing sequence replica to the result of multiplying the Q component of the received signal sequence and the I component of the synchronizing sequence replica.

In this way, possible to share multipliers used in correlation calculation and reduce the circuit scales of the receiving side.

Other Embodiments (1) In Embodiments 1 and 2, two sub-frames where different P-SCH sequences are allocated on a per sub-frame basis have been prepared in one frame. The P-SCH sequence is alternately allocated in time domain in a frame on a per sub-frame basis using either two P-SCH sequence configurations from the configuration of being the I and Q components of a SCH sequence as is (i.e. basic P-SCH sequence), the configuration of switching the I and Q components of a SCH sequence, the configuration of code-inverting the I component alone of a SCH sequence, and the configuration of code-inverting the Q component alone of a SCH sequence. For that reason, if the configuration of P-SCH sequence and the symbol position in the frame are detected, the frame timing can be also detected. That is, it is possible to detect the frame timing in the first step of cell search.

Figure 8:
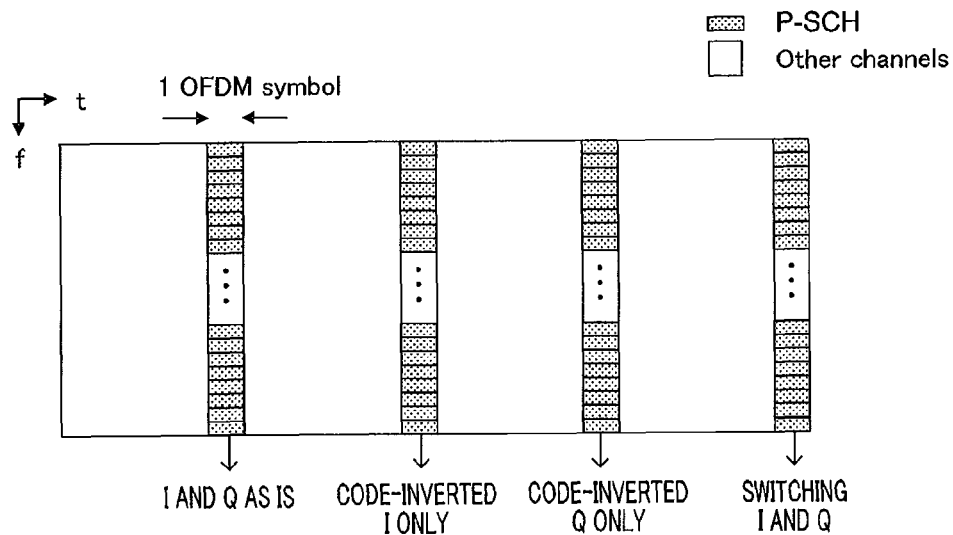
FIG. 8 illustrates for explanation of the frame configuration, according to other embodiments.

This advantage is not limited to the above frame configuration. That is, if a frame where up to four sub-frames are prepared in one frame is formed, as shown in FIG. 8, by assigning the P-SCH sequence from the above four kinds of P-SCH sequences to each sub-frame, it is also possible to provide the same advantage.

Figure 9:
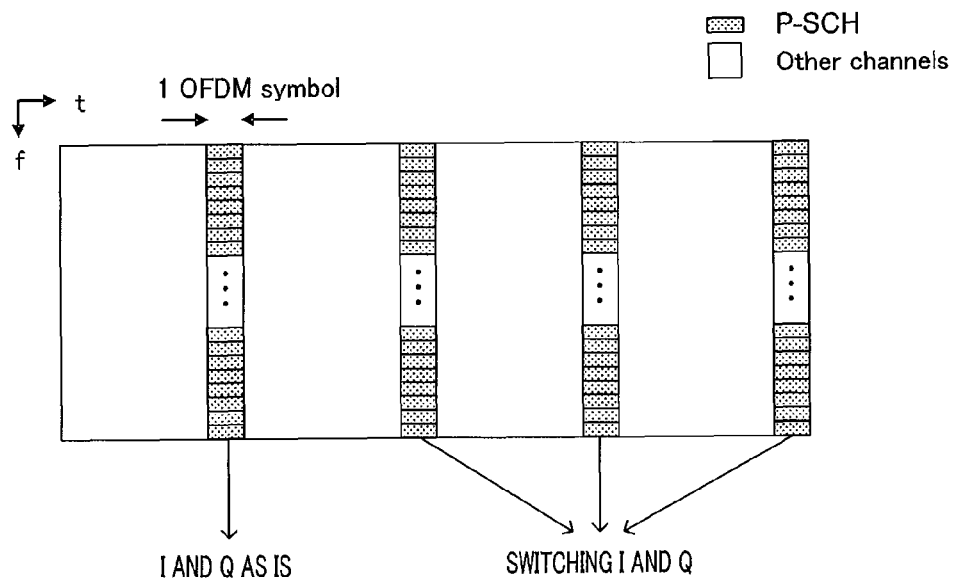
FIG. 9 explains the frame configuration, according to other embodiments.

(2) Further, even in the frame configuration as shown in FIG. 9, it is also possible to provide the same advantage. That is, the frame configuration shown in FIG. 9 shows that P-SCH configuration allocated in the first sub-frame is different from other sub-frames. By this means, it is possible to specify the frame timing immediately by specifying the symbol position of the P-SCH sequence allocated in the first sub-frame. Further, it is possible to specify the first sub-frame, and furthermore, specify the frame timing, by only determining whether or not P-SCH sequence of the first sub-frame is allocated for a symbol position every sub-frame, and by specifying the symbol position of the P-SCH sequence allocated in other sub-frames.

Figure 10:
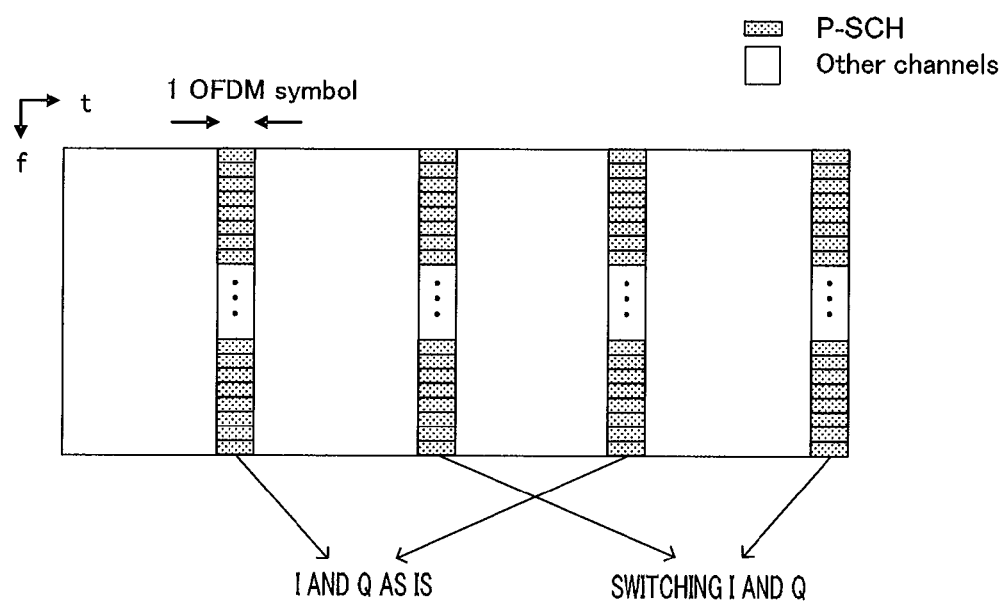
FIG. 10 explains the frame configuration, according to other embodiments.

(3) Further, although a frame timing is not allowed to be detected in the first step of cell search, a frame configuration that makes it possible to share multipliers in the above P-SCH correlation detecting section and be high speed cell search by reducing the amount of processing in the second step of cell search, will be shown below. For example, as shown in FIG. 10, SCH sequence where the I and Q components are as is and SCH sequence where the I and Q components are switched are alternately allocated on a per sub-frame basis. By this means, it is possible to share multipliers in the above P-SCH correlation detecting section as in Embodiment 1. Further, by detecting the configuration and the symbol positions of the SCH sequence, frame timing candidate points are narrowed down in the first step of cell search, so that it is possible to reduce the amount of processing in the second step of cell search as compared with a case of allocating the same SCH sequence to sub-frames. As a result, it is possible to realize high speed cell search. By not only selecting the combination of SCH sequence configurations shown in FIG. 10, and, by selecting two kinds of the above-described four configurations, it is possible to provide the same advantage.

INDUSTRIAL APPLICABILITY

The OFDM transmitting apparatus and OFDM receiving apparatus of the present invention are suitable for use to realize high speed cell search and reduce circuit scales.

The invention claimed is:

1. An orthogonal frequency division multiplexing transmitting apparatus comprising:
 a frame forming section that forms a frame, in which a first synchronizing sequence comprising a first symbol is allocated in a predetermined symbol position from a beginning of a first subframe in a plurality of subframes, and in which a second synchronizing sequence comprising a second symbol is allocated in the predetermined symbol position from a beginning of a second subframe neighboring the first subframe in a time domain, said second synchronizing sequence being formed with the second symbol in which an in-phase component and a quadrature component are switched from an in-phase component and a quadrature component of the first symbol of the first synchronizing sequence; and a transmitting section that transmits the frame using a single antenna.

2. An orthogonal frequency division multiplexing transmitting apparatus comprising:

a frame forming section that forms a frame, in which a first synchronizing sequence comprising a first symbol is allocated in a predetermined symbol position from a beginning of a first subframe in a plurality of subframes, and in which a second synchronizing sequence comprising a second symbol is allocated in the predetermined symbol position from a beginning of a second subframe neighboring the first subframe in a time domain, said second synchronizing sequence being formed with the second symbol in which only one of an in-phase component value and a quadrature component value is inverted compared to a corresponding one of an in-phase component value and a quadrature component value of the first symbol of the first synchronizing sequence; and a transmitting section that transmits the frame using a single antenna.

3. An orthogonal frequency division multiplexing receiving apparatus comprising:

a receiving section that receives a frame, in which a first synchronizing sequence comprising a first symbol is allocated in a predetermined symbol position from a beginning of a first subframe in a plurality of subframes, and in which a second synchronizing sequence comprising a second symbol is allocated in the predetermined symbol position from a beginning of a second subframe neighboring the first subframe in a time domain, said second synchronizing sequence being formed with the second symbol in which an in-phase component and a quadrature component are switched from an in-phase component and a quadrature component of the first symbol of the first synchronizing sequence; and a timing detection section that detects correlation using a received signal sequence received in the receiving section and a synchronizing sequence replica, wherein the timing detection section comprises:

four multipliers that multiply all combinations of an in-phase component and a quadrature component of the received signal sequence and an in-phase component and a quadrature component of the synchronizing sequence replica;

a first adder that adds a result of multiplying the in-phase component of the received signal sequence and the in-phase component of the synchronizing sequence replica to a result of multiplying the quadrature component of the received signal sequence and the quadrature component of the synchronizing sequence replica;

a second adder that subtracts a result of multiplying the in-phase component of the received signal sequence and the quadrature component of the synchronizing sequence replica from a result of multiplying the quadrature component of the received signal sequence and the in-phase component of the synchronizing sequence replica;

a third adder that adds the result of multiplying the in-phase component of the received signal sequence and the quadrature component of the synchronizing sequence replica to the result of multiplying the quadrature component of the received signal sequence and the in-phase component of the synchronizing sequence replica; and a fourth adder that subtracts the result of multiplying the quadrature component of the received signal sequence and the quadrature component of the synchronizing sequence replica from the result of multiplying the in-phase component of the received signal sequence and the in-phase component of the synchronizing sequence replica.

4. An orthogonal frequency division multiplexing receiving apparatus comprising:

a receiving section that receives a frame, in which a first synchronizing sequence comprising a first symbol is allocated in a predetermined symbol position from a beginning of a first subframe in a plurality of subframes, and in which a second synchronizing sequence comprising a second symbol is allocated in the predetermined symbol position from a beginning of a second subframe neighboring the first subframe in a time domain, said second synchronizing sequence being formed with the second symbol in which only an in-phase component value is inverted compared to an in-phase component value of the first symbol of the first synchronizing sequence; and a timing detection section that detects correlation using a received signal sequence received in the receiving section and a synchronizing sequence replica, wherein the timing detection section comprises:

four multipliers that multiply all combinations of an in-phase component and a quadrature component of the received signal sequence and an in-phase component and a quadrature component of the synchronizing sequence replica;

a first adder that adds a result of multiplying the in-phase component of the received signal sequence and the in-phase component of the synchronizing sequence replica to a result of multiplying the quadrature component of the received signal sequence and the quadrature component of the synchronizing sequence replica;

a second adder that subtracts a result of multiplying the in-phase component of the received signal sequence and the quadrature component of the synchronizing sequence replica from a result of multiplying the quadrature component of the received signal sequence and the in-phase component of the synchronizing sequence replica;

a third adder that subtracts the result of multiplying the in-phase component of the received signal sequence and the in-phase component of the synchronizing sequence replica from the result of multiplying the quadrature component of the received signal sequence and the quadrature component of the synchronizing sequence replica; and a fourth adder that adds a signal in which the result of multiplying the in-phase component of the received signal sequence and the quadrature component of the synchronizing sequence replica is inverted negative, to a signal in which the result of multiplying the quadrature component of the received signal sequence and the in-phase component of the synchronizing sequence replica is inverted negative.

5. An orthogonal frequency division multiplexing receiving apparatus comprising:

a receiving section that receives a frame, in which a first synchronizing sequence comprising a first symbol is allocated in a predetermined symbol position from a beginning of a first subframe in a plurality of subframes, and in which a second synchronizing sequence comprising a second symbol is allocated in the predetermined symbol position from a beginning of a second subframe neighboring the first subframe in a time domain, said second synchronizing sequence being formed with the second symbol in which only a quadrature component value is inverted compared to a quadrature component value of the first symbol of the first synchronizing sequence; and a timing detection section that detects correlation using a received signal sequence received in the receiving section and a synchronizing sequence replica, wherein the timing detection section comprises:

four multipliers that multiply all combinations of an in-phase component and a quadrature component of the received signal sequence and an in-phase component and a quadrature component of the synchronizing sequence replica;

a first adder that adds a result of multiplying the in-phase component of the received signal sequence and the in-phase component of the synchronizing sequence replica to a result of multiplying the quadrature component of the received signal sequence and the quadrature component of the synchronizing sequence replica;

a second adder that subtracts a result of multiplying the in-phase component of the received signal sequence and the quadrature component of the synchronizing sequence replica from a result of multiplying the quadrature component of the received signal sequence and the in-phase component of the synchronizing sequence replica;

a third adder that subtracts the result of multiplying the quadrature component of the received signal sequence and the quadrature component of the synchronizing sequence replica from the result of multiplying the in-phase component of the received signal sequence and the in-phase component of the synchronizing sequence replica; and a fourth adder that adds the result of multiplying the in-phase component of the received signal sequence and the quadrature component of the synchronizing sequence replica to the result of multiplying the quadrature component of the received signal sequence and the in-phase component of the synchronizing sequence replica.

* * * * *